Feb. 23, 1971  J. A. JOHNSTON  3,566,260
METHOD AND APPARATUS FOR MEASURING THE MOISTURE CONTENT
OF A PARTICULATE MATERIAL INCLUDING
MATERIAL FLOW CONTROL
Filed Sept. 30, 1968  2 Sheets-Sheet 1

INVENTOR
JOHN A. JOHNSTON

ATTYS.

United States Patent Office 3,566,260
Patented Feb. 23, 1971

3,566,260
METHOD AND APPARATUS FOR MEASURING THE MOISTURE CONTENT OF A PARTICULATE MATERIAL INCLUDING MATERIAL FLOW CONTROL
John A. Johnston, Deephaven, Minn., assignor to Cargill, Incorporated, a corporation of Delaware
Filed Sept. 30, 1968, Ser. No. 763,617
Int. Cl. G01r 27/26
U.S. Cl. 324—61                    4 Claims

ABSTRACT OF THE DISCLOSURE

A method and apparatus for measuring the moisture content of a particulate material such as a grain. Grain samples may be introduced into the apparatus without being weighed and the apparatus will automatically test the grain and provide a readout directly as a percentage of moisture by weight in the sample. By selective operation of a suitable switch means the apparatus may be adjusted to allow various kinds of grain to be tested.

---

The present invention relates to a method of and an apparatus for measuring the moisture content in a particulate material and, more particularly, it relates to a method of and an apparatus for rapid and automatic measurement of the moisture content of a sample of grain.

"Moisture content" of grain as used herein is the percentage of moisture by weight of a sample of grain. The moisture content of grain is an important factor in assessing the commerical value of the grain and in determining an appropriate period and kind of drying for the grain. Also, it is sometimes desired to mix quantities of grain having varying moisture contents to achieve a specified overall moisture content for the total mixed quantity.

In a typical grain handling facility the measurement is performed frequently and on many different types of grain, such as corn, soy beans, winter and spring wheat, oats and rye. It is therefore advantageous to be able to measure the moisture content of a sample of one type of grain rapidly and automatically and to be able to adapt readily to measuring the moisture content of a different type of grain.

Presently available devices suffer from a number of shortcomings and particularly in requiring relatively slow and time-consuming manual operations. For example, the sample of grain must be accurately weighed before being placed in the conventional moisture measuring devices. Also, the temperature of the sample of grain must be measured and a compensation calculated for the deviation from a standard reference temperature. In some instances, the measuring devices indicate only a relative electrical value which must be converted, by means of slide rule, chart, or other device, to a percentage figure to indicate the moisture content for the specific type of grain being tested. Also, when desiring to measure different kinds of grain, portions of the electrical circuitry of the measuring device must be changed. In general, these prior art devices require considerable time, skill and accessory equipment and increase the possibilty of error in the result.

It is a principal object of this invention to provide an accurate, rapid and automatic method and apparatus for measuring the moisture content of a sample of a granular material.

It is another principal object of the invention to provide an apparatus capable of being selectively adjusted for automatically measuring the moisture content of an unweighed sample of various kinds of grains.

Other objects and advantages of the present invention will become apparent from the detailed description taken with the accompanying drawings in which.

Figure 1:
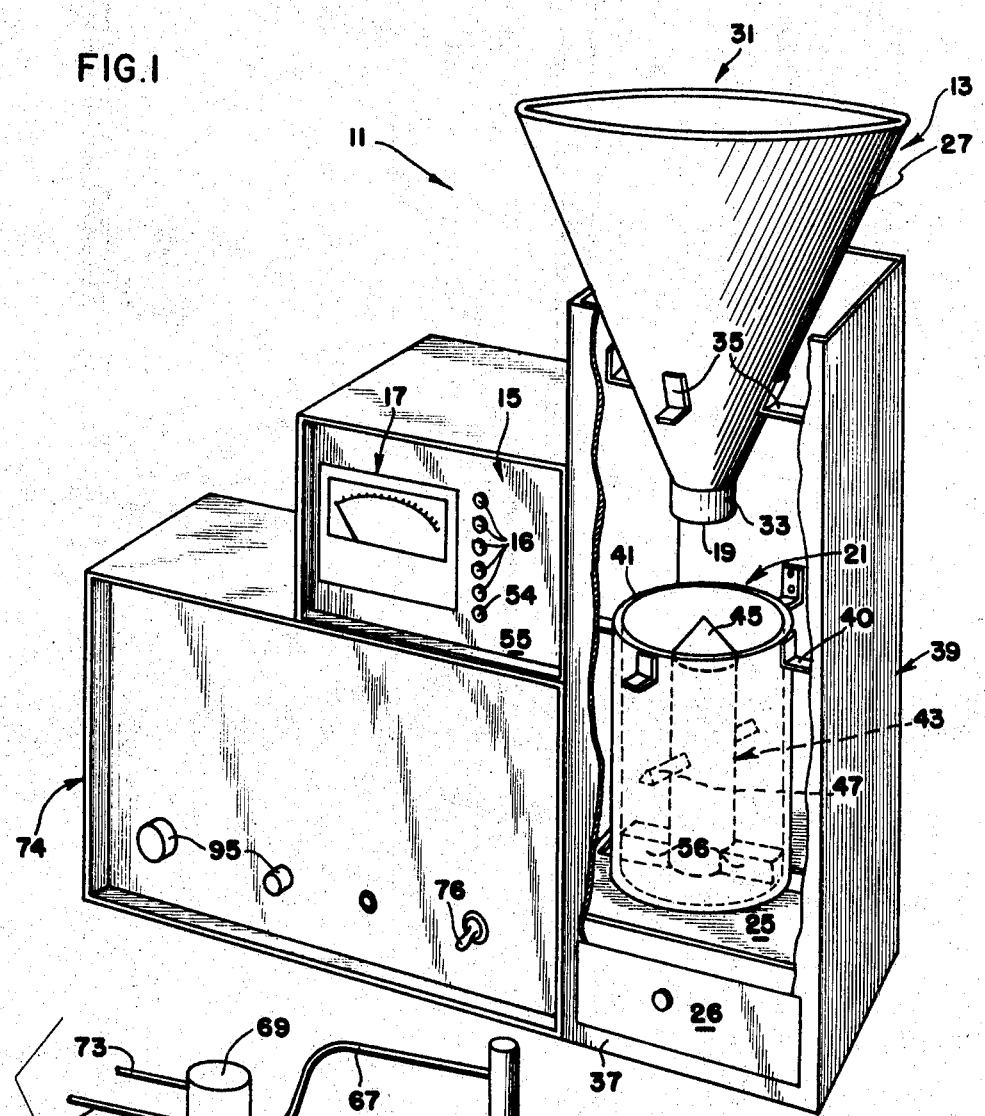
FIG. 1 is a perspective view of an apparatus with portions of the housing broken away to expose elements of the apparatus disposed within the housing.

Generally, as shown in the drawings for purposes of illustration, the invention is embodied in an apparatus 11 (FIG. 1) for and a method of directly and quickly measuring the moisture content of granular material introduced into a hopper 13 without the necessity of weighing the granular material before introducing the same into the hopper. The illustrated apparatus is capable of testing the moisture content of each of several different kinds of granular material such as, for example, corn, winter wheat, spring wheat, rye, oats or soy beans merely by selective operation of a switch means 15 in the form of a plurality of push buttons 16 each associated with one of the kinds of grain to be tested. As will be explained, the moisture content of an unweighed sample of grain introduced into the hopper 13 is automatically and quickly expressed directly as a percentage of moisture, usually 11–20%, on an indicator or display means which, in this instance, is in the form of a meter 17.

Before proceeding with a detailed description of the illustrated apparatus, a brief description of the method of measuring the moisture content of grain introduced into the hopper 13 will be given. A quantity, such as a scoopful, of grain is introduced into the hopper 13. The grain flows through the hopper and out an orifice 19 at the bottom of the hopper at a substantially uniform rate and into an aligned and underlying container or cell 21 having a predetermined volumetric capacity which is considerably less than the volume of grain introduced into the hopper. As the grain flows from the hopper at the predetermined rate and through a preselected distance, it packs the cell with a relatively uniform consistency. Preferably, sufficient grain is in the hopper to fill the capacitance cell heaping full with a generally rounded or conically shaped head at the top of the cell 21. The apparatus having been adjusted for the kind of grain being tested by operation of the switch means 15, an electrical circuit means automatically measures an electrical characteristic of the grain in the cell, such as the capacitance of the grain relative to a standard capacitance, and causes a direct readout of the percentage of moisture on an indicating means such as the meter 17.

Figure 2:
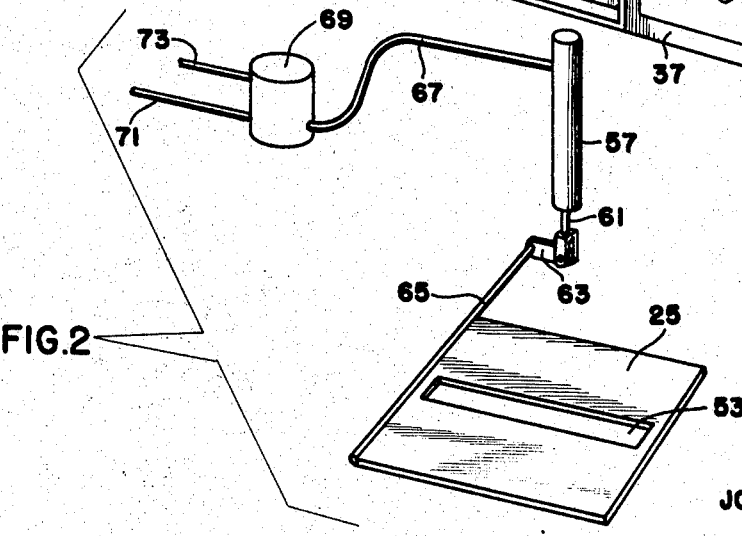
FIG. 2 is a schematic, perspective view of a gate and gate operating mechanism for use with the apparatus of FIG. 1.
Figure 3:
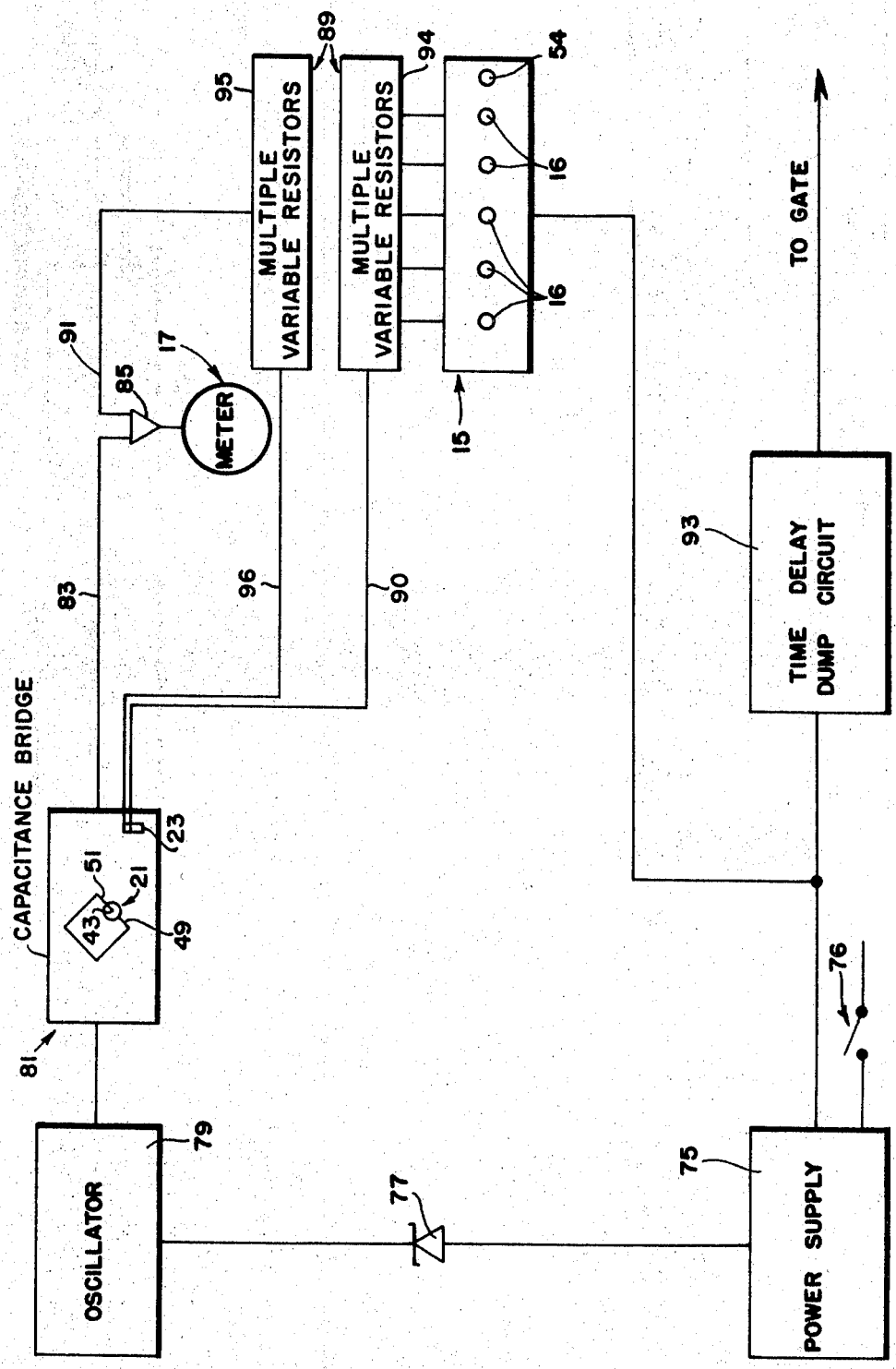
FIG. 3 is a schematic block diagram of an electrical control circuit for use in the apparatus of FIG. 1.

As will be explained in greater detail, temperature compensating means such as a thermistor 23 (FIG. 3) may be provided in the cell 21 to measure the temperature of the grain sample and to adjust the percentage figure read from meter 17 to eliminate any substantial error which otherwise might be caused by temperature deviations of the sample from that of a standard reference temperature. Once the moisture content has been read, the grain in the cell may be removed automatically by operating a means such as a gate 25 (FIGS. 1 and 2) from a closed position in which the gate 25 covers the bottom of the container 21 to an open position in which the bottom of the cell is uncovered and the grain is free to flow from the cell. The grain drops from the gate 25 into a receptacle such as a slidable and removable drawer 26, or alternatively, into a suitable automatic grain conveying system such as shown in U.S. Pat. No. 3,384,420. The gate 25 is returned to cover the lower end of the cell and the apparatus is ready for another sample. Thus, various grains may be tested quickly and automatically without weighing the grain samples or performing any calculations.

Proceeding now with a detailed description of the illustrated and preferred apparatus, the grain hopper 13 for receiving the grain is in the form of a funnel with a truncated, conically shaped side wall 27 which causes all of the grain introduced therein to flow by gravity from the hopper orifice 19. The size of the orifice 19 at the lower end of the funnel shaped hopper is related to the volume of the hopper so that the amount of grain delivered therein, for example, a scoopful of grain introduced by simple dumping motion, is choked, i.e., retarded against immediately moving through the funnel orifice 19 and flowing from the hopper as fast as it is introduced into it. Stated differently, the funnel shaped hopper will be filled at a much faster rate than the grain leaves at the orifice whereby the grain in the hopper is in a relatively static state immediately after being introduced, except for that portion of the grain which first reaches the bottom of the funnel. It is intended that the wall of the hopper defining the orifice be of a shape and size to cause the grain to flow at a relatively uniform rate from the hopper. The grain falls through a short distance to the container and has been found to provide a relatively constant packing fraction, i.e., the ratio of actual volume occupied by the grain particles to the geometric volume. Also, the orifice 19 is sized relative to the size of the particles that several of granules of the grain flowing therethrough may not bridge across the orifice and reduce or stop entirely the flow of grain. As the density of a given kind of grain varies only slightly within the normal range of moisture content of 10 to 20%, the substantially constant packing fraction and the substantially constant volume obtained for each sample results in the samples having weights differing only slightly and within the usual tolerance limits.

In this preferred embodiment of the invention, the funnel shaped hopper 13 has an orifice of about 1½ inches in diameter and the funnel extends upwardly for about 8½ inches in height from the orifice 19 to a top opening 31 which is about 10 inches in diameter. The side wall 27 of the funnel shaped hopper has a uniform taper for most of the length of the funnel and terminates at a small cylindrical portion 33, the lower end of which defines the orifice 19.

The average distance that each of the grain samples fall from the orifice 19 into the cell is preferably maintained constant; and to this end, the hopper 13 is fixed to and supported by suitable brackets 35 fastened to vertically extending side walls 37 defining a boxlike housing 39 enclosing the container 21. In a similar manner, brackets 40 extend between the cell 21 and the housing side walls 37 to fasten the cell 21 to the housing. In the illustrated apparatus, the hopper orifice 19 is spaced at a height of about 3⅜ inches from a top rim 41 for the cell 21. This distance has been found to provide adequate free fall for the grain and has been found to result in relatively uniform and constant packings of particles in and over the capacitance cell. Since the volume occupied by a grain will be substantially constant for each one of successive runs of the samples and the amount of grain packed into this volume is also held substantially constant, the weight of each grain sample has been found to be within the usual weight tolerance limits. Hence, samples of substantially uniform weight are obtained without the tedious and time-consuming conventional manual weighing operations.

The illustrated capacitance cell 21 is cylindrical in shape with its longitudinal axis generally coaxial with the axis of the funnel shaped hopper 31. Disposed centrally within the cell 21 is a center electrode 43 which is also substantially cylindrical in height from its lower end to an upper end on which is a conically shaped cap 45. In this instance, the upper end of the center electrode 43 is disposed slightly below the rim 41 of the cell so that the entire center electrode may be covered with grain at the time of measuring the electrical capacitance of the grain in the cell. The illustrated cell 21 is about 3¾ inches in diameter and about 7¼ inches in height with the center electrode being about 1¾ inches in diameter and with the top of the center electrode spaced about ⅜ inch below the rim 41 of the cell. Thus, the grain falling into the cell is shaped into a tubular configuration except at the top cap 45 for the electrode.

The center electrode 43 is suitably supported and aligned on the longitudinal axis of the capacitance cell by horizontally disposed support bars 47 fastened at radially inner ends to the outer wall of the center electrode 43 and fastened at radially outer ends to the inner side of the cell wall. The support bars 47 are triangular in cross section with a pointed side disposed upwardly to prevent grain from accumulating on them. Suitably connected wires 49 and 51 (FIG. 3) extend to the center electrode 43 and to the wall of the capacitance cell 21 so that the capacitance of the grain sample may be taken. The thermistor 23 may be physically located within the cell 21 at the center electrode 43 or in the support bars 47 to measure the temperature of the grain in the cell.

The gate 25 for covering the lower end of the cell during packing and testing of grain is in the form of a flat generally rectangular plate disposed within the box like housing 39 and pivotally mounted therein to extend horizontally across and seal with the annular opening at the bottom of the cell 21 and its center electrode 43. To prevent excessive accumulation of grain on the gate 25 and about the sides of the cell to the extent that it would interfere with the testing, the gate 25 has a rectangularly shaped opening 53 (FIG. 2) therein which extends outwardly beyond the sides of the cell 21 to allow some grain on the outside of the cell to fall through the opening 53 and into a receptacle (not shown) beneath the gate. Within the cell 21 is a bar 56 of rectangular cross section which is disposed over and aligned with the opening 53 in the gate 25 and prevents grain from falling from the cell 21 while the gate 25 is in a closed position.

The means for pivoting the gate 25 between its closed and open positions includes a power actuator which operates in response to operation of a suitable switch such as a push button 54 on a control panel 55 of a housing for the electrical control and meter 17. The preferred power actuator is an air cylinder 57 (FIG. 2) having an internal piston (not shown) for driving a connecting rod 61 with a clevis at its outer free end connected to a crank arm 63. The crank arm is fixed to an end of a gate supporting rod 65 which is suitably mounted in the housing 39 and extends generally horizontally to provide a horizontal pivot axis for the side of the gate 25 attached to the rod. The air cylinder 57 is connected to a pneumatic line 67 which, in turn, is connected to a solenoid operated valve 69 connected to a source of compressed air through an air inlet line 71. As will be explained in greater detail, the solenoid operated valve 69 is operated with depression of the push button 54 which causes energization of its solenoid over a lead 73 from the electrical control circuit.

The electrical means for converting the capacitance measured by the capacitance cell 21 into a direct percentage moisture readout on the meter 17 may take various forms and may be a conventional capacitance gauge. A suitable capacitance gauge is described hereinafter in connection with the electrical circuit illustrated in FIG. 3. The electrical apparatus is housed within a housing 74 adjacent the housing 39 for the capacitance cell. A suitable power supply 75 is connected to a conventional AC electrical source with operation of an on-off switch 76 on the housing 74. From the power supply 75 power is applied through a Zener diode 77 to an oscillator 79. The output signal of the oscillator 79 serves as the input signal to a capacitance bridge 81 which has the capacitance cell 21 forming a portion of one leg of the capacitance bridge 81. The capacitance bridge is suitably balanced for a given standard capacitance. A grain sample disposed in the capacitance cell 21 unbalances the capacitance bridge in relationship to the amount of moisture therein. The unbalancing of the capacitance bridge furnishes an output signal which is directed across a lead 83 and serves as one input to a differential amplifier 85.

To adjust the amplifier gain for the signal from the capacitance bridge 81 and to adjust for deviations from a standard reference temperature, the power supply 75 is also connected through the operated one of the push buttons to a first group 94 of two groups 94 and 95 of precalibrated resistor circuits 89 each of which may be operated for the specific type of grain to be measured. After the grain sample is in the capacitance cell 21, the operator will push the appropriate push button 16 on the control panel 55 and this results in an output from the first group of variable resistors 89 across lead 90 becoming an input to the temperature compensating thermistor 23. The thermistor is located in the test cell and serves to generate a signal which is directed over lead 96 to another variable resistor selected from the second group 95 of the resistors 89 and the output from this second variable resistor is the second input over lead 91 to the differential amplifier 85. The variable resistors selected by operation of one of the push buttons 16 are precalibrated to control the gain of the amplifier 85 for the type of grain being measured. The result is that the differential amplifier receives one input due to the capacitance of the grain sample in the cell 21 and another input from the thermistor 23 and multiple variable resistors. The gain of the amplifier 85 thus causes the meter needle to swing and indicate a percentage figure.

After noting the percentage of moisture in the sample, the operator will eject the sample in the cell by depressing push button 54 which operates a time delay dump circuit 93. The latter energizes the solenoid valve 69 to admit air to the cylinder 57 which extends the connecting rod 61 and rotates crank 63 and rod 65 to pivot the gate 25 down to its open position. After a predetermined time as determined by the time delay, relay dump circuit 93, the energizing circuit for the solenoid valve 69 is broken and the gate 25 again closes.

Recapitulating, an operator merely places an unweighed quantity of grain in the hopper 13 sufficient to fill the smaller capacity cell 21 and watches the grain flow from the hopper into the cell. When the hopper is empty, the operator will depress the appropriate push button for the grain being tested and observe the swinging of the meter needle to indicate on a scale the percentage of moisture in the sample. After noting the moisture percentage, the operator will depress the "dump" push button 54 which causes the gate 25 to pivot to its open position allowing the grain to fall from within and about the cell. After a few seconds of time, the gate will automatically return to its closed position and the operator may place the next quantity of grain in the hopper.

The preferred manner of operation is to heap the grain to form a mound above the rim 41 of the cell 21 although it is within the purview of the invention that the operator scrapes and levels the grain to the top rim 41 of the cell 21. Also, it is within the purview of the invention that the grain flow from the orifice 19 to fill and pack in a container (not shown) which is separate from the capacitance cell and that after the predetermined volume of grain is obtained that the same then be transferred to the separate capacitance cell. While the preferred range of percentage of moisture usually does not exceed 20% by weight, it will be appreciated that by adjusting suitable control switches 95 that a percentage range may be increased from that which is the normal range of moisture content for these types of grain.

From the foregoing, it will be seen that the moisture content of a quantity of grain may be quickly and automatically obtained without weighing and without time consuming calculations. Each of a number of different kinds of grain may be tested in turn with selective operation of a switch means.

While a preferred embodiment has been shown and described, it will be understood that there is no intent to limit the invention by such disclosure but, rather, it is intended to cover all modifications and alternate constructions falling within the spirit and scope of the invention as defined in the appended claims.

What is claimed is:

1. An apparatus for measuring the moisture content of a sample of particulate material comprising means for receiving a quantity of said particulate material, means defining an orifice for said receiving means and for limiting the flow of said particulate material to a substantially uniform rate of flow through said orifice, a container spaced beneath said orifice for receiving said particulate material and at a predetermined distance therebelow sufficient to provide a free fall at said flow rate into said container, a gate movable to a closed position to cover said lower end of said container to catch and hold said sample until said container fills and forms a mound on the top of said container and said particulate material overflows said mound to provide a substantially uniform packing fraction for the sample in said container, electrical means for sensing an electrical characteristic of said predetermined volume of said particulate material for said packing fraction, means for directly displaying said electrical characteristic as a percentage of moisture in said particulate material, and means including a time delay means for moving said gate to an open position for a predetermined period of time sufficient to release all of said particulate material for discharge from said container before returning said gate to said closed position.

2. An apparatus in accordance with claim 1 in which said receiving means is in the shape of a funnel having a lower portion which provides a choked flow therethrough to said orifice to provide said uniform rate of flow.

3. An apparatus in accordance with claim 1 in which said electrical means includes a plurality of circuits each preadjusted to electrical values and associated with one of several different particulate materials and further includes switch means to selectively connect said circuits for the particulate material being tested.

4. A method of measuring the moisture content of a sample of granular material in a batch process without weighing or measuring the volume of the granular material, comprising the steps of: providing a cell of predetermined volume with a closed lower end, introducing granular material into a receiver disposed above said cell, choking said flow of said granular material through said receiver and releasing said material at an orifice from said receiver spaced at a predetermined distance above said cell to provide a uniform flow rate, permitting said granular material to flow to fill said cell and to mound over the top of said cell and to overflow the same, sensing an electrical characteristic of the granular material in the cell, and converting the electrical characteristic measured directly to a percentage rating indicating the percentage of moisture in said granular material, and dumping all of said sample from said cell after having measured the electrical characteristic thereof.

(References on following page)

References Cited

UNITED STATES PATENTS

| | | | |
|---|---|---|---|
| 2,673,327 | 3/1954 | Morelock | 324—65 |
| 2,825,870 | 3/1958 | Hart | 324—40 |
| 3,002,150 | 9/1961 | Batteau | 324—61 |
| 3,090,004 | 5/1963 | Breen et al. | 324—61 |
| 3,231,814 | 1/1966 | Fathauer et al. | 324—61 |
| 1,878,109 | 9/1932 | Clark | 324—61 |
| 2,231,035 | 2/1941 | Stevens et al. | 324—61 |
| 2,277,953 | 3/1942 | Christensen | 324—61 |
| 2,665,409 | 1/1954 | Rogers | 324—61 |
| 2,696,588 | 12/1954 | Criner | 324—40 |
| 2,759,147 | 8/1956 | Stein | 324—61 |
| 3,209,247 | 9/1965 | Mead et al. | 324—61 |
| 3,320,528 | 5/1967 | Esenwein | 324—61 |

EDWARD E. KUBASIEWICZ, Primary Examiner